United States Patent [19]

Muszynski

[11] Patent Number: 5,850,607
[45] Date of Patent: Dec. 15, 1998

[54] METHOD AND APPARATUS FOR PROVIDING CONTROL HANDOFF IN A CELLULAR TELECOMMUNICATIONS SYSTEM

[75] Inventor: Peter Muszynski, Espoo, Finland

[73] Assignee: Nokia Telecommunications Oy, Espoo, Finland

[21] Appl. No.: 619,458

[22] PCT Filed: Sep. 24, 1993

[86] PCT No.: PCT/FI93/00384

§ 371 Date: Aug. 13, 1996

§ 102(e) Date: Aug. 13, 1996

[87] PCT Pub. No.: WO95/08898

PCT Pub. Date: Mar. 30, 1995

[51] Int. Cl.[6] .................................................. H04Q 7/00
[52] U.S. Cl. .......................................... 455/442; 455/436
[58] Field of Search .................................... 455/436, 437, 455/438, 439, 440, 442, 445, 422; 370/331, 337

[56] References Cited

U.S. PATENT DOCUMENTS

| | | | |
|---|---|---|---|
| 4,737,978 | 4/1988 | Burke et al. | 455/438 |
| 5,101,501 | 3/1992 | Gilhousen et al. | |
| 5,267,261 | 11/1993 | Blakeney, II et al. | 455/437 |
| 5,278,892 | 1/1994 | Bolliger et al. | 455/442 |
| 5,305,308 | 4/1994 | English et al. | 455/445 |
| 5,640,414 | 6/1997 | Blakeney, II et al. | 375/200 |

FOREIGN PATENT DOCUMENTS

| | | |
|---|---|---|
| 0 421 535 | 4/1991 | European Pat. Off. . |
| 0 483 091 | 4/1992 | European Pat. Off. . |
| 0 570 643 | 11/1993 | European Pat. Off. . |

OTHER PUBLICATIONS

"An Overview of the Application of Code Division Multiple Access (CDMA) to Digital Cellular Systems and Personal Cellular Networks", 1992, pp. 1–58.

*Primary Examiner*—Dwayne D. Bost
*Assistant Examiner*—Myron K. Wychey
*Attorney, Agent, or Firm*—IP Group of Pillsbury Madison & Sutro LLP

[57] ABSTRACT

In a cellular telecommunications system having mobile exchanges, base stations and user mobile stations roaming in the system, the mobile exchanges are arranged to provide inter-exchange soft handoff with diversity combining. The mobile exchanges further are arranged to provide for control handoff, wherein user communications control handoff, wherein user communications control and signal diversity combining functions involved with the user communications are handed off from a first mobile exchange to a second mobile exchange.

8 Claims, 3 Drawing Sheets

METHOD AND APPARATUS FOR PROVIDING CONTROL HANDOFF IN A CELLULAR TELECOMMUNICATIONS SYSTEM

FIELD OF THE INVENTION

The present invention relates to cellular telecommunications systems. More specifically, the present invention relates to a novel and improved system for controlling soft handoff between a mobile station and base stations which are connected to different mobile switching centers within a cellular telecommunications system.

BACKGROUND OF THE INVENTION

The use of code division multiple access (CDMA) modulation is but one of several techniques enabling digital communications among a number of mobile users utilizing a common part of the radio spectrum, as is the case for cellular telecommunications system. Other well-known radio access techniques are time division multiple access (TDMA) and frequency division access (FDMA). The concept of control handoff is indeed applicable to all three of the mentioned multiple access techniques. The background of the present invention will be illustrated by means of a CDMA cellular telecommunications system. However, it should be understood that the present invention is not limited to CDMA. An exemplary application of CDMA to cellular telecommunications systems has been substantially described in "On the System Design Aspects of Code Division Multiple Access (CDMA) Applied to Digital Cellular and Personal Communications Networks", Allen Salmasi and Klein S. Gilhousen, presented at the 41st IEEE Vehicular Technology Conference on May 19–22, 1991 in St. Louis, Mo.

In the above mentioned publication a direct-sequence CDMA (DS-CDMA, or for short, CDMA in the following) technique is described in which a number of user mobile stations (MSs) communicate via CDMA radio spread spectrum signals with base stations (BSs, also referred to as cell sites) in the uplink (mobile station to base station) and downlink (base station to mobile station) directions. The base stations convert these CDMA radio signals originating from, respectively terminating at, the user's MS into a form appropriate for use in conjunction with terrestrial telecommunications transmission equipment such as the commonly deployed Pulse Code Modulation (PCM) circuit facilities. The base stations further relay these user signals in the uplink and downlink directions to the mobile switching center (MSC, also referred to as mobile exchanges or mobile telephone switching office (MTSO)) for further processing.

The above-mentioned user communication signals comprise digitized voice signals and control information (also referred to as signalling). The MSC performs multiplexing and conversion operations on the other mentioned tributaries and relays the voice signal to another user, e.g. within the Public Switched Telephone Network (PSTN). The MSC also interprets, reacts upon and generates signaling information, thus controlling the overall communication link between the users. These communications link control functions comprise the management of general call-related events such as call setup or tear down as well as CDMA radio link related events such as the deterioration of the CDMA radio link quality and subsequent handoff initiation.

If CDMA is deployed within the typical medium-to large-sized cells of land mobile telecommunications systems then the average time delay spread of the multipath radio propagation environment is usually larger than the chip duration of the DS-CDMA signal. This forces CDMA to operate in an asynchronous mode with the consequence that the orthogonality of the spread spectrum multiple access user signals cannot be achieved by means of orthogonal spreading codes alone. Therefore, the communications suffer from system self-induced interference not only among signals originating from different cells but in addition to that also considerably within a single cell (referred to as CDMA intra-cell interference). For such CDMA cellular systems it is therefore an important overall system design objective to minimize any excessive CDMA interference among the communicating users and complementary, to capture and utilize as much energy from a desired CDMA user signal as possible. This system design requirement, although a generic requirement applicable to any multiple access method within cellular telecommunications systems, is less stringent for FDMA- and TDMA-based systems in which intra-cell interference is avoided by the intrinsic properties of the respective multiple access method and inter-cell interference is limited by means of pre-planned cellular frequency re-use schemes. Thus, CDMA unlike FDMA or TDMA operates in a strictly interference-limited manner. In the following, the background of the invention is exemplified for the case of a CDMA cellular telecommunications system.

Several methods implementing the above-mentioned CDMA system design objective can be readily identified for the above-referenced exemplary embodiment of a CDMA cellular telecommunications system. For example, the described closed loop MS transmit power control method has the objective to continuously equalize the received qualities of all uplink CDMA signals within a single BS against the background of rapidly changing radio propagation channels undergoing fast and slow fading processes. For this purpose, the BS measures periodically the received Eb/No value, indicative of the signal quality, from each MS CDMA uplink communication and subsequently transmits an appropriate power control command on the downlink communication channel to the MS which in turn sets the CDMA transmitter power accordingly. Ideally, all MS CDMA uplink signals are received at the BS with the same quality and in addition to that, minimum strength necessary in order to maintain the communication link subject to a predetermined quality threshold.

Another embodiment of the previously mentioned system design objective is the method of mobile assisted soft handoff in conjunction with signal diversity combining during an active CDMA communication which will be summarized in the following.

Mobile assisted soft handoff in conjunction with signal diversity combining comprises the method of relaying user communication signals on the transmission segment between MS and MSC concurrently via a first and a second BS in the uplink and downlink direction and performing signal diversity reception at the MS and MSC in order to enhance the user signal quality. This method is invoked by the MSC when an MS communicating initially with a BS has moved into the overlapping coverage areas of this first BS and a second BS and has reported the availability of a sufficiently strong signal from this second BS to the MSC. At no time instant during soft handoff in conjunction with signal diversity combining does the MS interrupt its communications with the MSC. The MSC typically deploys post-detection/decoding, selective combining of the digitally encoded speech frames.

In order to enable the reporting assistance of the MS during soft handoff initiation, all BSs may transmit a CDMA downlink reference signal, referred to as a pilot signal. MSs when roaming throughout the service area of the CDMA cellular telecommunications system periodically demodulate the pilot signals of the various neighboring BSs during an ongoing communication with a first BS and derive a corresponding pilot signal quality indication. This indication determines a ranked list of candidate BSs for handoff and is transmitted in form of signalling information to the MSC. It should be understood that also the first BS may perform continuously CDMA uplink signal quality strength and measurements and based upon these observations may give a soft handoff request indication to the MSC.

Usually, soft handoff in conjunction with signal diversity combining is initiated by the MSC if the MS reports that the pilot signal quality of a second BS in addition to that of the first BS is sufficiently good according to the predetermined thresholds made available to the MS and the MSC as well as the second BS can obtain the required resources for the soft handoff transition. Subsequently, the MS will be instructed by the MSC via the first BS by means of signalling to initiate a soft handoff and to commence signal diversity combining on the downlink.

Moreover, MSC initiates the additional relay of user signals via the second BS and commences diversity combining of the user signal in the uplink direction. Both participating BSs invoke autonomously the previously mentioned closed loop power control method. The MS sets its CDMA transmit power to the minimum of the two commanded power levels in order to reduce excessive CDMA interference with the other communication links.

Finally, when the MS is firmly established within the area of the second BS and the pilot signal received from the first BS has weakened sufficiently according to the predetermined thresholds made available to the MS it will report this condition to the MSC, which in turn decides to terminate the soft handoff with signal diversity combining and will use subsequently only the second BS for maintaining the CDMA communications.

This process of soft handoff with signal diversity combining may be repeated as the MS moves within the service area of the CDMA cellular telecommunications system and as the measured CDMA signal quality indications suggest.

Some of the contemporary TDMA based cellular telecommunications systems also utilize the assistance of the MS in form of corresponding MS downlink signal quality measurements as trigger for requesting a handoff from a first BS to a second BS, much in the same way as summarized above. However, these systems usually use a scheme referred to as hard handoff in which the MS in response to instructions from the MSC disrupts the communication with the first BS, tunes into the indicated TDMA radio channel of the second BS, and then resumes the uplink and downlink communications. At no time instant does the MS communicate with more than one BS simultaneously and hence, no corresponding signal diversity combining takes place in the MS nor in the MSC as is the case for the soft handoff method described above. This hard handoff scheme is applicable to CDMA in a similar manner as well, but should be avoided whenever possible, for reasons of CDMA system capacity as explained in the following.

Within the context of soft and hard handoff the previously mentioned predetermined thresholds used in conjunction with the MS downlink signal quality measurements for the determination of handoff candidate BSs are also referred to as handoff margins. The use of these handoff margins in conjunction with time averaging processes is necessary in order to avoid frequent handoffs (also referred to as handoff Ping-Pong effect) when the MS moves within the usually fuzzy border between the radio signal coverage areas of two neighboring BSs. Such frequent handoffs would overload the processing capacity of the MSCs. For the purpose of controlling the CDMA soft handoff with signal diversity combining the handoff margin can be chosen as small as 1–3 dB in contrast to the hard handoff case where usually 6–10 dB are required in order to avoid the deleterious handoff Ping-Pong effect.

Referring to the previously mentioned interference limited operation of CDMA, small handoff margins are indeed an essential requirement for an efficient operation of CDMA. The use of CDMA hard handoff in conjunction with the necessary large hard handoff margins would substantially decrease the CDMA system capacity. In a CDMA cellular telecommunications system hard handoff can be tolerated only in exceptional situations but not as a normal mode of system operation. Soft handoff with signal diversity combining therefore is to be provided on a seamless basis throughout the CDMA system service area.

Prior art CDMA cellular telecommunications systems provide soft handoff with signal diversity combining only between BSs which are connected to one and the same MSC (referred to as intra-MSC soft handoff with signal diversity combining). If the MS is to be handed off between BSs connected to different MSCs prior art CDMA cellular telecommunications systems use CDMA hard handoff instead.

In the copending U.S. patent application of the Muzynski, application No. 08/619,461, filed Mar. 25, 1996, there is presented a system and a method for soft handoff with signal diversity combining among base stations connected to different mobile exchanges of a cellular telecommunications system, in the following referred to as inter-exchange soft handoff with signal diversity combining. The novel approach thus enables a seamless soft handoff throughout the whole system service area. One disadvantage is that when the control of the user communications and diversity combining functions remain at the first exchange involved in a sequence of subsequent inter-exchange soft handoffs many inter-exchange connections remain reserved and many exchanges are involved as the mobile station roams within the system.

SUMMARY OF THE INVENTION

It is an object of the present invention in conjunction with the soft handoff to provide a method and system to hand off the communications link control functions and diversity combining functions from a first exchange to a second exchange without disrupting any of the active radio communication links between the communicating mobile station and base stations with the objective to minimize the usage of terrestrial transmission facilities during instances of inter-exchange soft handoff with signal diversity combining. It is thus an object of the present invention to provide a novel method of handoff affecting only system control functions and the terrestrial links between base stations and mobile exchanges but not the radio links between mobile stations and base stations of an active user communication.

The invention relates to a control handoff method in a cellular telecommunications system, comprising the steps of executing an inter-exchange soft handoff between a first and a second mobile exchange, during which the communications control and signal diversity combining functions involved with the handoff continue to reside at the first mobile exchange, and then executing a handoff of the communications control and signal diversity combining functions from the first controlling mobile exchange to the second relaying mobile exchange in the following referred to as 'control handoff'.

The aspect of the control handoff between controlling and relaying exchanges in conjunction with an inter-exchange soft handoff provides an optimization of the utilization of transmission of resources involved in the inter-exchange soft handoff.

One aspect of the invention is a cellular telecommunications system, comprising mobile exchanges, base stations, and user mobile stations roaming in the system, each of the mobile exchanges comprising means for inter-exchange soft handoff with diversity combining, wherein the mobile exchanges further comprise means for control handoff, wherein user communications control and signal diversity combining functions involved with the user communications are handed off from a first mobile exchange to a second mobile exchange.

BRIEF DESCRIPTION OF THE DRAWINGS

The features and advantages of the present invention will become more apparent from the detailed description set forth below when taken in conjunction with the drawings.

DETAILED DESCRIPTION OF THE PREFERRED EMBODIMENTS

Figure 1:
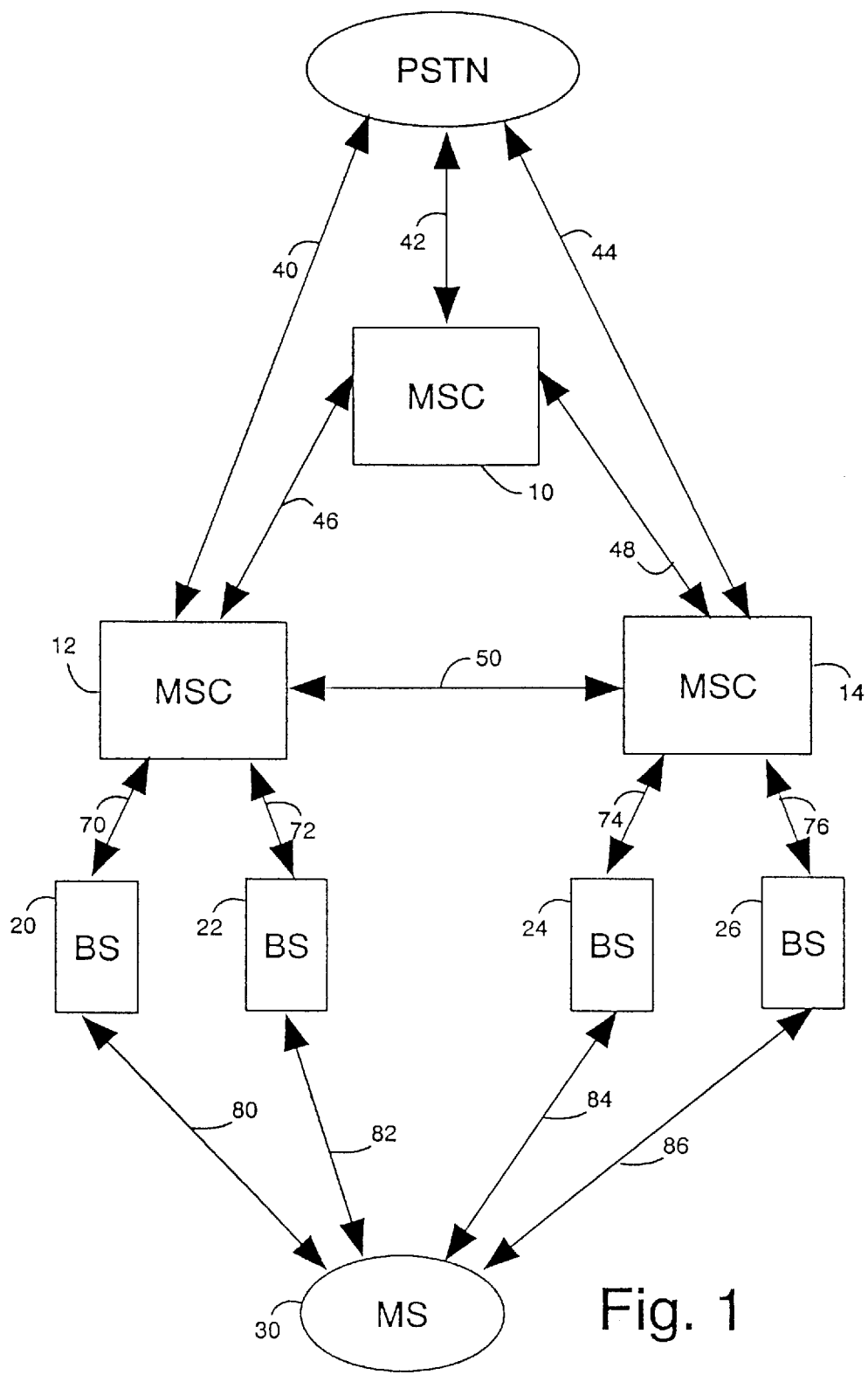
FIG. 1 is a schematic overview of an exemplary CDMA cellular telecommunications system in accordance with the present invention.

FIG. 1 shows an exemplary embodiment of a CDMA cellular telecommunications system.

Figure 2:
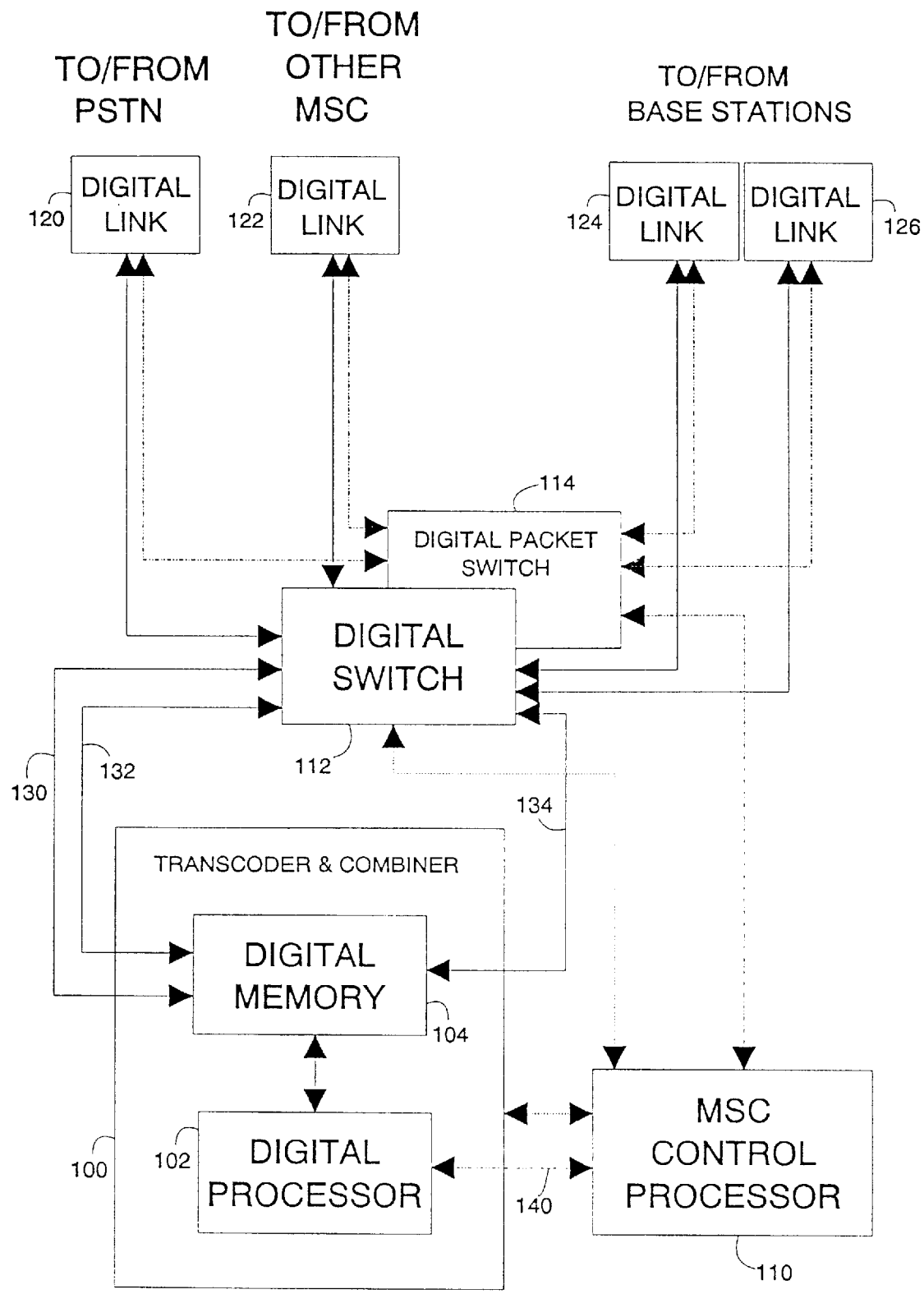
FIG. 2 is a block diagram showing a preferred embodiment of a mobile switching center for use within a CODMIA cellular telecommunications system.

FIG. 2 shows an exemplary embodiment of a MSC used in a CDMA cellular telecommunications system to which the present invention relates.

Digital links (120,122,124,126) connect the mobile exchange MSC with the Public Switched Telephone Network PSTN, other mobile exchanges MSC and base stations BS, respectively. These digital links carry the user information such as voice and, additionally, signalling information. The preferred embodiment of the present invention assumes that the signalling information is multiplexed together with the user information onto one and the same physical transmission facility. T1 transmission facilities together with Signalling System No 7 may serve as an exemplary embodiment of such a digital link arrangement.

The user information stream is switched among the mentioned entities by means of a digital switch 112. The corresponding signalling information is transmitted, received and relayed by a packet switch 114. Packet switch 114 is also connected to a MSC control processor 110 which acts as a signalling information source and sink, respectively. MSC control processor 110 interprets and reacts upon signalling messages addressed to it and may also solicit signalling messages to other entities, whenever appropriate. MSC control processor 110 also controls the connection arrangements within the digital switch 112 in accordance with the call status. Moreover, MSC control processor 110 allocates and releases transcoder & combiner equipment 100 during call setup and tear down from a corresponding resource pool (only one piece of this transcoder & combiner equipment 100 is shown in the figure).

Transcoder & combiner equipment 100 is needed in order to convert between the typically μ-law encoded voice as used in the PSTN and the low rate digital voice coding such as CELP used on the radio links. In addition to the transcoding function, transcoder & combiner equipment 100 also implements the signal diversity combing in the up-link direction and signal duplication in the downlink direction.

In the preferred embodiment of the present invention, the user communication signals, comprising digitized voice or data, multiplexed together with the signalling information related to this connection, are carried in a digital, framed format suitable for the terrestrial transmission links 124,126 between the BSs and the MSC. These frames are subsequently referred to as transcoder & combiner frames. In addition to this user information, transcoder & combiner frames may also contain information supplied by the BSs which is relevant to the signal quality as used for the signal diversity combining within the MSC in the uplink direction.

These transcoder & combiner frames arriving and leaving on the circuits 130,132,134 are buffered in the digital memory 104 for the uplink and downlink direction, respectively. Digital processor 102 reads and writes cyclically the transcoder & combiner frames from and to digital memory 104. In the uplink direction, a signal quality indication attached to the transcoder & combiner frames arriving from circuits 130,132 into the memory 104 is inspected and processor 102 performs the diversity selection based on these indications. In the downlink direction, voice samples arriving from circuit 134 into the memory 104 are transcoded and packed into transcoder & combiner frames by processor 102.

Transcoder & combiner equipment 100 by means of the digital processor 102 also extracts, respectively inserts, the user signalling information from, respectively into, the transcoder & combiner frames and offers, respectively receives, this signalling information to MSC control processor 110 via a circuit 140. By these means, MSC control processor 110 receives MS signalling information such as pilot signal quality measurement reports. Thus, MSC control processor 110 possesses the necessary information to initiate and terminate inter-MSC or intraMSC soft handoffs, as well as control handoffs. Furthermore, by these means MSC control processor 110 can issue the appropriate handoff commands to the MS via circuits 140,130,132 and links 124,126 as well as via the digital packet switch 114 and link 122 to other MSCs, should this be required.

Figure 3:
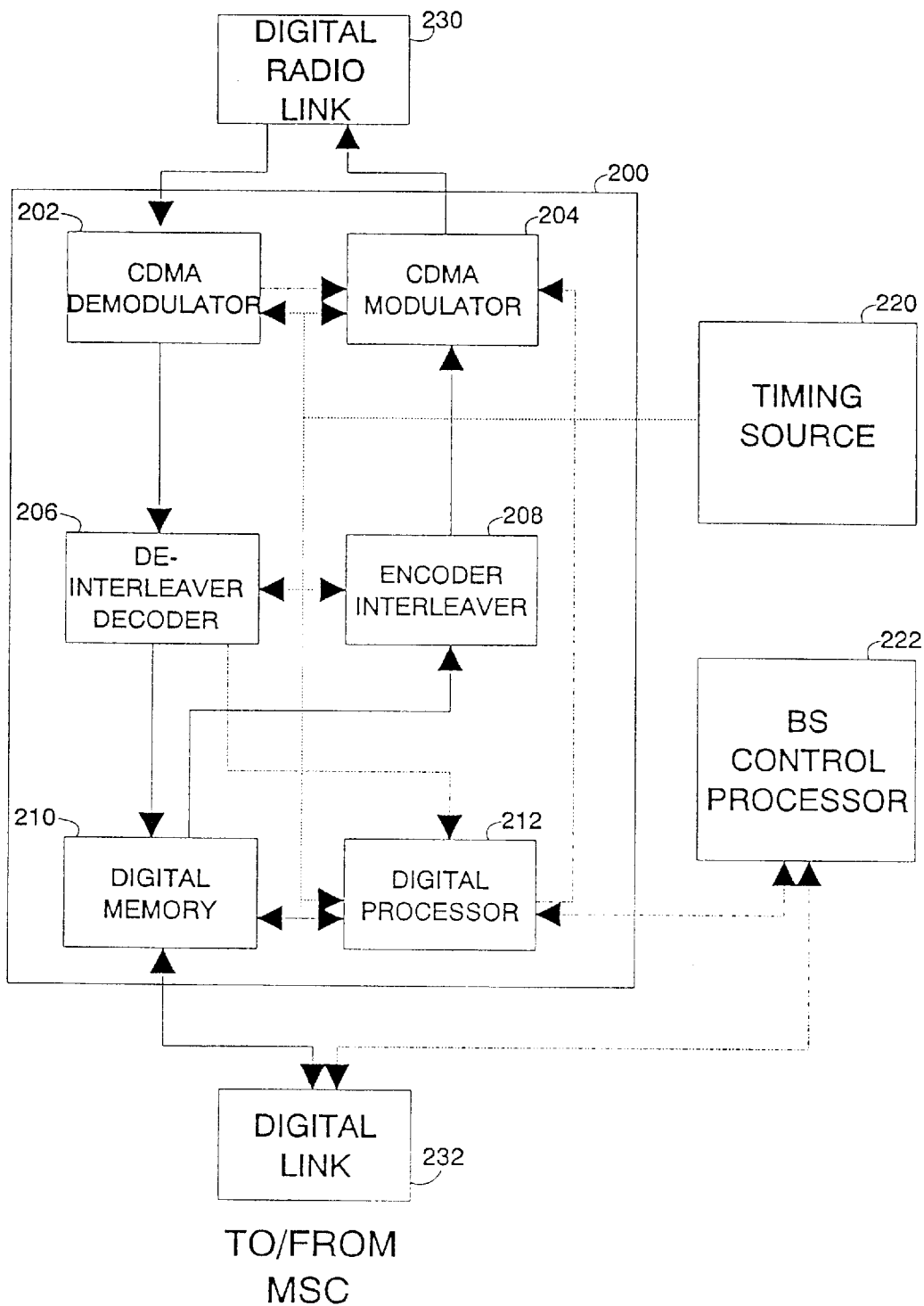
FIG. 3 is a block diagram showing a preferred embodiment of a base station for use within a CDMA cellular telecommunications system.

FIG. 3 shows an exemplary embodiment of a BS used in a CDMA cellular telecommunications system to which the present invention relates.

Block 200 shows the apparatus required to support a single CDMA communication within a BS, referred to as CDMA channel equipment (only one is shown).

In the uplink direction, the CDMA user communication signals are received from the digital CDMA radio link 230, demodulated by the CDMA demodulator 202, de-interleaved and channel decoded by the de-interleaver & decoder 206, converted into transcoder & combiner frames and buffered for the terrestrial transmission within digital memory 210 and finally transmitted on the digital link 232 towards the MSC.

In the downlink direction, the transcoder & combiner frames are received from the MSC via digital link 232, buffered and converted into a presentation appropriate for the BS within digital memory 210, channel encoded and interleaved by encoder & interleaver 208, CDMA modulated by the CDMA modulator 204 and finally transmitted on the digital radio link 230.

In the preferred embodiment of the present invention the BS possesses a network independent timing source 220 which provides a reference signal of high accuracy as required for efficient CDMA operation and utilized by the CDMA channel equipment 200. Such a timing source may be derived, e.g., from the GPS satellite signal and can be provided globally to each BS thus enabling a network of mutually synchronized BSs.

The BS further comprises a BS control processor 222. The BS control processor 222 receives and transmits signalling information from and to digital link 232 connected to the MSC. The BS control processor 222 performs the resource management of the BS, such as the allocation and releasing CDMA channel equipment for user connections (calls). The BS control processor 222 thus responds to CDMA channel assignment requests related to a call setup as well as to CDMA channel assignment requests related to soft handoff requests from the MSC.

Digital processor 212, in conjunction with the buffer memory 210, performs the packing and unpacking of the BS internal representation of the CDMA user communications signal to and from transcoder & combiner frames in the uplink, respective downlink direction. In the preferred embodiment of the present invention, the previously mentioned transcoder & combiner frames also contain information supplied by the de-interleaver & channel decoder 206 and provided to the digital processor 212 which is indicative of the signal quality of the CDMA radio frames as received from the uplink CDMA radio link 230 and which is used for the signal diversity combining within the MSC in the uplink direction.

To support the description of the present invention, control handoff, mobile assisted inter-exchange (or inter-MSC) soft handoff and macrodiversity signal combining techniques in a CDMA cellular telecommunications system is described in detail in the following.

Initiation of inter-MSC soft handoff with signal diversity combining (FIG. 1)

In the following it is assumed that an MS 30 communicates via a first BS 24 connected to a first MSC 14 which provides access to the PSTN and other MSCs 10,12.

The inter-MSC soft handoff with signal diversity combining is initiated when the MS 30 moves from the coverage area of the serving BS 24 connected to the first MSC 14 to the coverage area of a second BS 22 connected to a second MSC 12 and the MS pilot signal quality measurements indicate that a soft handoff to the second BS 22 is appropriate. The MS signals this measurement indication via the first BS 24 to the first MSC 14 including identification information of the second BS 22.

The first MSC 14 in turn, detects from cellular configuration data that BS 22 is connected to another MSC 12 and passes subsequently an inter-MSC soft handoff request to this second MSC 12. This handoff request identifies the CDMA code channel and frequency which MS 30 currently uses and additionally, the identity of the inter-MSC circuit 50 reserved by MSC 14 for the this transaction.

MSC 12 passes this handoff request further on to BS 22 after reserving and switching through an appropriate circuit 72. BS 22 analyzes the handoff request and, if the requested resources are available, allocates a further CDMA code channel to be used by MS 30 for the downlink connection 82 which is signaled back to MSC 12 and MSC 14. BS 22 will also activate the downlink direction of connection 82 using the newly assigned CDMA code channel. BS 22 will further start demodulating the CDMA uplink connection 82 using the CDMA context information related to MS 30 and subsequently relaying the user communication signals via MSC 12 back to MSC 14 for diversity combining. BS 22 may signal the successful acquisition and reception of the CDMA uplink connection 82 to MSC 14 via MSC 12.

MSC 14 will send a handoff request via BS 24 to MS 30 including the identity of the newly allocated CDMA code channel. MSC 14 will also commence diversity signal combing of the user communication signals on the uplink once the user communications signals following the legs 84–74, respectively 82–72–50, have been received in synchronism.

MS 30, after having received the handoff request, commences signal diversity combining of the first CDMA downlink connection 84 and the second, newly allocated downlink connection 82. The successful initiation of the inter-MSC soft handoff with signal diversity combining is then signaled from MS 30 to MSC 14.

Termination of inter-MSC soft handoff with signal diversity combining (FIG. 1)

The inter-MSC soft handoff with signal diversity combining is terminated if the MS leaves completely the coverage area of one of the participating BSs and penetrates deeply into the coverage area of the other BS.

In the following, it is assumed that MS 30 has penetrated deeply into the cell covered by BS 22 and therefore the pilot signal coming from BS 24 has weakened below a predetermined threshold in the previously described inter-MSC soft handoff configuration. Thus, the leg 84–74 shall be removed from the inter-MSC soft handoff with signal diversity combining.

MS 30 will inform MSC 14 via a pilot signal quality measurement report that the signal coming from BS 24 has weakened below a predetermined threshold. MSC 14 decides to drop the leg 84–74 and thus to terminate the inter-MSC soft handoff with signal diversity combining. To this end, MSC 14 sends a handoff termination signal via BS 24 and MSC 12-BS 22 to MS 30. MS 30 will stop the downlink demodulation diversity combing of the signal coming from BS 24 and will communicate from now on with BS 22 only. MS 30 signals via BS 22 and MSC 12 the successful termination of the inter-MSC soft handoff with signal diversity combining back to MSC 14 which, in turn, will request BS 24 to terminate the CDMA radio link 84 and to release the corresponding resources. MSC 14 will also free the terrestrial link 74 and terminate the uplink diversity combining. This completes the termination of the inter-MSC soft handoff with signal diversity combining. It should be understood that MSC 14 is still in charge of all control and signalling functions related to the communications with MS 30. Functionally, the leg 50–72–82 is treated similar to a direct MSC-ES interconnection (such as via BS 24); the only difference is the additional relay functions performed by MSC 12. MSC 12 will therefore be completely transparent to all control and signalling functions invoked by MSC 14, BS 22 and MS 30.

It should be understood that the above-described inter-MSC soft handoff with signal diversity combining may be applied several times during an ongoing communication. It should also be understood that more than two BSs can participate during an inter-MSC soft handoff with signal diversity combining. E.g., it may have been the case that in addition to BS 24 and BS 22 also BS 20 would have participated via link 70 and an additional circuit on the link 50 in the inter-MSC soft handoff with signal diversity combining. Also more than two MSCs may participate in an inter-MSC soft handoff with signal diversity combining. E.g., it may have been the case that in addition to BS 24 and BS 22 another BS (not shown) connected to MSC 10 would have participated via link 48 in the inter-MSC soft handoff with signal diversity combining. Common to these scenarios is that MSC 14 is always in charge of all control and signaling functions related to the communications with MS 30 and thus serves an anchor regarding all CDMA radio resource related functions.

The present invention comprises a novel type of handoff which should be utilized in conjunction with the above described inter-MSC soft handoff as follows. It is assumed that an inter-MSC soft handoff with signal diversity combining has taken place as described earlier and that MS 30 communicates via BS 22, the controlling MSC 14 and the relaying MSC 12. It is assumed further that MS 30 moves into the coverage area of BS 20 and, according to the inter-MSC soft handoff with signal diversity combining, the additional leg 80–70–50 will be backhauled to MSC 14 in addition to the already existing leg 82–72–50. However, this results in two inter-MSC circuits on the link 50 to be used for this communication. It would be advantageous in this situation, if the system could handoff the control and signal diversity combining functions from MSC 14 to MSC 12, so that all control and diversity combining functions take place closer to BSs 20,22 and thus only one inter-MSC circuit on the link 50 would be necessary.

This novel type of handoff, in the following referred to as control handoff, is the object of the present invention. The control handoff does not affect radio links directly, in fact the network control handoff is executed by the MSCs only, without direct involvement of the MS, and may be involved much later than the last inter-exchange soft handoff.

However, as there are switching and circuit rearrangements taking place within the network it may happen that signalling information between MS and the controlling MSC is lost. Therefore, a reset operation of the signalling link layer (Layer 2 within the OSI model) of the MS-MSC links will be necessary in order to restore the consistency of the signalling connections. However, such a reset operation does not affect the physical radio link layer (Layer 1) nor the call processing (Layer 3). As a consequence, the usual CDMA closed loop power control operation can be performed between MS and the supporting BSs without any disruption by the control handoff.

The control handoff method is described in detail for the following exemplary configuration (FIG. 1): MS 30 communicates during an inter-MSC soft handoff via BSs 20,22 and the relaying MSC 12, and is controlled by the MSC 14 which also performs the diversity combining. Thus, two circuits are currently in use for this transaction on the digital link 50. The other party is assumed to be within the PSTN and is connected via link 44 to the MSC 14. The network control handoff shall take place from MSC 14 to MSC 12.

Firstly, from the pilot signal quality measurement reports performed by MS 30, MSC 14 learns that MS 30 is firmly established within the coverage areas of BSs 20,22 which are part of the system area controlled by MSC 12. Thus, a control handoff to MSC 12 will be decided by MSC 14. To this end, MSC 14 will reserve an additional third circuit towards MSC 12 on the digital link 50. MSC 14 may already now establish a bridge connection in the downlink direction, connecting the leg 44 coming from the PSTN with both circuits of the digital link 50 used within this transaction. MSC 14 may also connect already now the uplink of the newly allocated, third circuit of digital link 50 to the PSTN leg 44. Thus, at this point in time the uplink direction of user information and signalling is disrupted, where as the downlink communications continues undisrupted. However, none of the radio links 80,82 are affected by the ongoing control handoff.

Secondly, MSC 14 will request the network control handoff towards MSC 12 by sending appropriate signalling information to MSC 12, indicating also the newly allocated, third circuit on the transmission link 50. MSC 12 in turn will allocate and activate the required resources needed to process and control the ongoing communications. These resources include, but are not limited to, facilities to perform the diversity combining of the uplink user information frames, voice transcoding equipment for voice communications, MS and BS signalling link terminations and appropriate control processes. MSC 14 will switch over the uplink and the downlink direction of the links 70,72 to the uplink, respectively downlink, direction of the newly allocated, third circuit of link 50 via the diversity combining and voice transcoding facilities. Once this operation is completed, the bi-directional communications of user information of MS 30 with the PSTN is fully restored.

Moreover, the signalling link to and from MS 30 can be connected to the newly allocated control processes within MSC 12. It is at this point in time that MSC 12 may send a signalling link reset indication to MS 30 to Layer 2 of the MS-MSC links in order to restore the consistency of the signalling connections. MS 30 will respond to this reset operation by initializing its signalling link context together with MSC 12. However, such a reset operation does not affect the physical radio link layer (Layer 1). As a consequence, the usual CDMA closed loop power control operation can be performed between MS 30 and the supporting BSs 20,22 without any disruption by the network control handoff. Moreover, the signalling related to the call processing (Layer 3) is not affected.

Lastly, MSC 12 will acknowledge the successful completion of the network control handoff to MSC 14 by sending an appropriate signal back to MSC 14. MSC 14 will free the resources related to this user communication, including, but not limited to, facilities to perform the diversity combining of the uplink user information frames, voice transcoding equipment for voice communications, MS and BS signalling link terminations and appropriate control processes. MSC 14 will also release the first and second circuit on digital link 50. MSC 14 is thus not involved any more in controlling the call. However, MSC 14 will still serve as a switching point between digital links 50 and 44.

It should also be understood that the method of the present invention can be readily applied to a TDMA cellular telecommunications system. In a TDMA cellular telecommunications system radio links 80, 82, 84, 86 of FIG. 1, would be embodied as TDMA radio links in which several timeslots are used to provide communications channels to the systems users. During soft handoff, in particular, during inter-exchange soft handoff with diversity combining, two (or more) timeslots could be used to provide the concurrent radio channels used by the MS and BSs involved in the handoff. All the other mentioned characteristics of the present invention remain the same for TDMA cellular telecommunications system.

The previous description of the preferred embodiments are provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiment herein, but is to be accorded the widest scope consistent with the principles as novel features disclosed herein.

I claim:

1. A control method in a cellular telecommunications system, comprising the steps of:

a user mobile station relays ongoing user communications signals via at least one of a plurality of base station relays ongoing user communications signals via at least one of a plurality of base stations;

said base stations further relay said user communications signals via at least one of a plurality of mobile exchanges to and from another system user; executing an inter-exchange soft handoff between a first and a second mobile exchange;

having user communications control and signal diversity combining functions involved with the handoff at the first mobile exchange;

executing a control handoff of said user communications control and signal diversity combining functions from said first mobile exchange to said second mobile exchange; and maintaining said first mobile exchange as a switching point for digital transmission connections between said other system user and said second mobile exchange.

2. The control method according to claim 1, wherein said control handoff comprises the steps of:

requesting a control handoff from said second mobile exchange by said first mobile exchange, allocating and activating user communication control and diversity combining resources required by said second mobile exchange for processing and controlling said ongoing user communications signals, taking control of said ongoing user communications signals by means of said allocated resources, informing a respective mobile station about the control handoff, acknowledging the successful completion of the control handoff to said first mobile exchange, releasing resources which were involved with said ongoing user communications signals at said first mobile exchange.

3. The control method according to claim 1 or 2, wherein: said control handoff is executed in a CDMA system.

4. The control method according to claim 1 or 2, wherein: said control handoff is executed in a TDMA system.

5. A cellular telecommunications system, comprising:

a plurality of mobile exchanges, a plurality of bases stations, and a plurality of user mobile stations roaming in the system, each of the mobile exchanges comprising means for inter-exchange soft handoff of ongoing user communications with diversity combining, said mobile exchanges each further comprising means for control handoff, wherein user communications control and signal diversity combining functions involved with said ongoing user communications are arranged to be handed off in a control handoff from a first mobile exchange to a second mobile exchange, the first exchange being maintained as a switching point for digital transmission connections between a system user and said second mobile exchange.

6. The system according to claim 5, wherein said means for the control handoff comprises:

means at said first mobile exchange for requesting a control handoff from said second mobile exchange, means at said second mobile exchange for allocating and activating user communications control and diversity combining resources required by said second mobile exchange for processing and controlling said ongoing user communications to thereby provide allocated resources, means at said second mobile exchange for taking control of said ongoing user communications by means of said allocated resources, means at said second mobile exchange for informing a mobile station about a control handoff, means at said second mobile exchange for acknowledging the successful completion of said control handoff to said first mobile exchange, and means at said first mobile station for releasing resources which were involved with said ongoing user communications at the said first mobile exchange.

7. The system according to claim 5 or 6, wherein: said system is a CDMA system.

8. The system according to claim 5 or 6, wherein: said system is a TDMA system.

* * * * *